(12) United States Patent
Chuang et al.

(10) Patent No.: US 10,785,682 B2
(45) Date of Patent: Sep. 22, 2020

(54) DATA UNIT PROCESSING METHOD AND COMMUNICATION DEVICE APPLYING THE DATA UNIT PROCESSING METHOD

(71) Applicant: MEDIATEK INC., Hsin-Chu (TW)

(72) Inventors: Wei-Ping Chuang, Hsin-Chu (TW);
Hsuan-Yu Liu, Hsin-Chu (TW);
Hung-Tao Hsieh, Hsin-Chu (TW);
Wen-Hsien Chiu, Hsin-Chu (TW);
Ching-Chia Cheng, Hsin-Chu (TW);
Hsin-Yi Lee, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/205,232

(22) Filed: Nov. 30, 2018

(65) Prior Publication Data

US 2019/0174351 A1    Jun. 6, 2019

Related U.S. Application Data

(60) Provisional application No. 62/595,125, filed on Dec. 6, 2017.

(51) Int. Cl.
| | |
|---|---|
| H04W 4/00 | (2018.01) |
| H04W 28/06 | (2009.01) |
| H04L 27/26 | (2006.01) |
| H04W 16/14 | (2009.01) |
| H04W 84/12 | (2009.01) |

(52) U.S. Cl.
CPC ....... *H04W 28/065* (2013.01); *H04L 27/2613* (2013.01); *H04L 27/2666* (2013.01); *H04W 16/14* (2013.01); *H04W 84/12* (2013.01)

(58) Field of Classification Search
CPC ... H04W 28/065; H04W 16/14; H04W 84/12; H04W 52/00; H04L 27/2613; H04L 27/2666
USPC ........................................................ 370/338
See application file for complete search history.

(56) References Cited

U.S. PATENT DOCUMENTS

| | | | |
|---|---|---|---|
| 2013/0051260 A1* | 2/2013 | Liu | H04L 27/2613 370/252 |
| 2016/0156750 A1* | 6/2016 | Zhang | H04L 69/22 370/338 |
| 2016/0323424 A1* | 11/2016 | Merlin | H04L 69/22 |
| 2018/0014216 A1* | 1/2018 | Banerjea | H04W 24/08 |

FOREIGN PATENT DOCUMENTS

| | | |
|---|---|---|
| CN | 107078986 A | 8/2017 |
| WO | 20181084689 A1 | 5/2018 |

* cited by examiner

*Primary Examiner* — Mang Hang Yeung
(74) *Attorney, Agent, or Firm* — Winston Hsu

(57) ABSTRACT

A data unit processing method performed by a first communication device, comprising: configuring a data unit by the first communication device, the data unit comprising: a specific format preamble following a first packet format; and a symbol part, comprising at least one symbol and following a Wi-Fi long range packet format. The specific format preamble can be decoded according to a first communication standard and the symbol can be decoded according to a Wi-Fi long range mode. The symbol part can be identified according to the specific format preamble. A method can decode the above-mentioned data unit and a communication device can perform the methods are also disclosed.

21 Claims, 4 Drawing Sheets

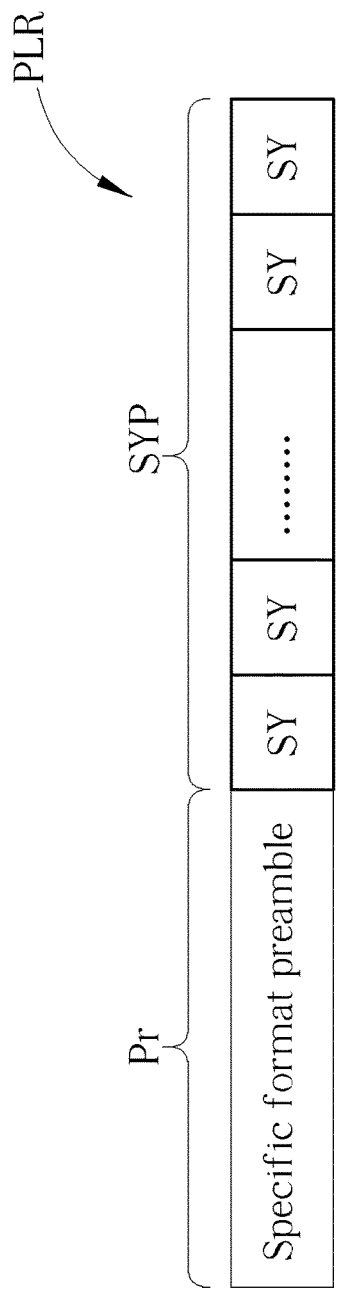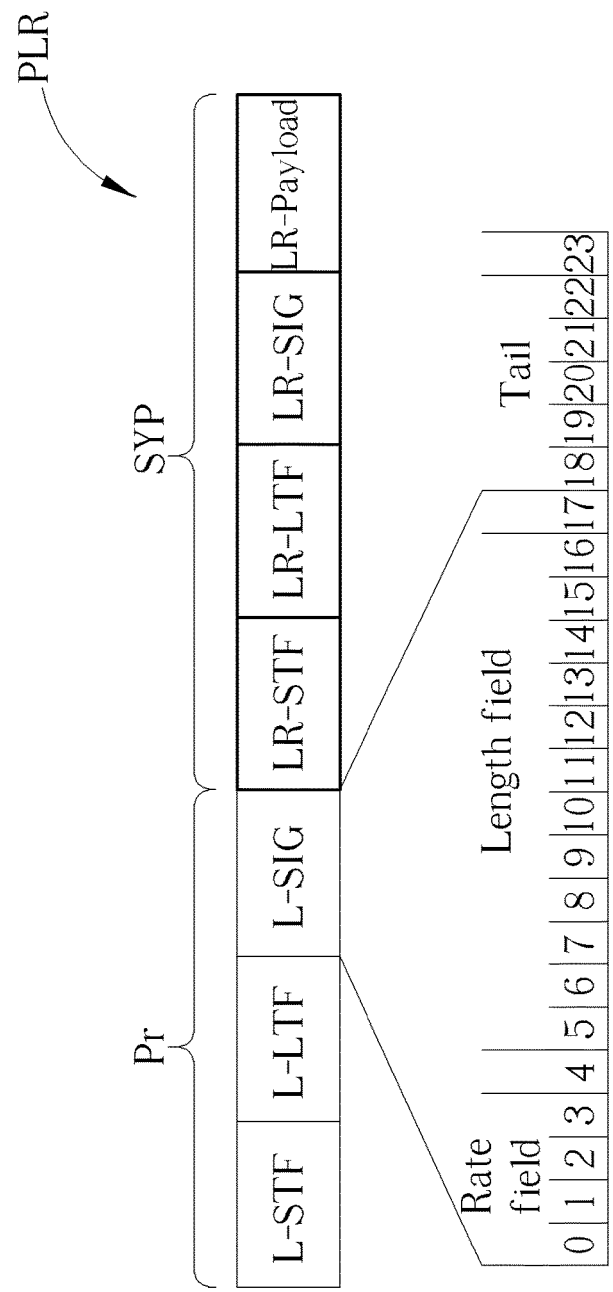

DATA UNIT PROCESSING METHOD AND COMMUNICATION DEVICE APPLYING THE DATA UNIT PROCESSING METHOD

CROSS REFERENCE TO RELATED APPLICATIONS

This application claims the benefit of U.S. Provisional Application No. 62/595,125, filed on 2017 Dec. 6, the contents of which are incorporated herein by reference.

BACKGROUND

A long range Wi-Fi system has a better sensitivity than a legacy Wi-Fi system, thus can transmit packets for a longer distance. However, the packets of the long range Wi-Fi system follow a packet format different from which for packets of the legacy Wi-Fi system. Therefore, the legacy Wi-Fi system could not identify the Wi-Fi long range packet and could not successfully decodes the Wi-Fi long range packet when the Wi-Fi long range packets arrives at the legacy Wi-Fi system.

Accordingly, the hardware of a conventional legacy Wi-Fi system is independent from the hardware of a conventional long range Wi-Fi system, thus increases the cost of a wireless communication system and causes some inconvenience of users.

Therefore, a new wireless communication method is needed.

SUMMARY

Therefore, one objective of the present application is to provide a data unit processing method and a communication system, which can construct a data unit can be received according to a Wi-Fi legacy mode and can be decoded according to a Wi-Fi long range mode.

Therefore, one objective of the present application is to provide a data unit processing method and a communication system, which can receive a legacy preamble and signal according to a Wi-Fi legacy mode and can decode the long range data unit according to a Wi-Fi long range mode.

One embodiment of the present application discloses a data unit processing method performed by a first communication device, comprising: configuring a data unit by the first communication device, the data unit comprising: a specific format preamble following a first packet format; and a symbol part, comprising at least one symbol and following a Wi-Fi long range packet format. The specific format preamble can be decoded according to a first communication standard and the symbol can be processed according to a Wi-Fi long range mode. A length of the symbol part can be determined according to the specific format preamble and the symbol part can be identified according identifying information in the symbol part.

Another embodiment of the present application discloses a communication device, comprising: a control circuit, configured to execute program codes stored in a storage device to configure a data unit comprising: a specific format preamble following a first packet format; and a symbol part, comprising at least one symbol and following a Wi-Fi long range packet format. The specific format preamble can be decoded according to a first communication standard and the symbol can be processed according to a Wi-Fi long range mode. A length of the symbol part can be determined according to the specific format preamble and the symbol part can be identified according identifying information in the symbol part.

Another embodiment of the present application discloses a data unit decoding method performed by a communication device, for decoding a data unit comprising a specific format preamble following a first packet format and comprising a symbol part with at least one symbol following a Wi-Fi long range packet format, comprising: (a) processing the specific format preamble to determine a length of the symbol part and determining whether the symbol part follows the first packet format or follows the Wi-Fi long range packet format according to identifying information contained in the symbol part; (b) applying a first communication standard to decode the symbol part when the symbol part follows the first packet format; and (c) applying a Wi-Fi long range mode to process the symbol part when the symbol part follows the Wi-Fi long range packet format.

Still another embodiment of the present application discloses a communication device, for decoding a data unit comprising a specific format preamble following a first packet format and comprising a symbol part with at least one symbol following a Wi-Fi long range packet format, comprising: a control circuit, configured to execute program codes stored in a storage device to perform: (a) processing the specific format preamble to determine a length of the symbol part and determining whether the symbol part follows the first packet format or follows the Wi-Fi long range packet format according to identifying information contained in the symbol part; (b) applying a first communication standard to decode the symbol part when the symbol part follows the first packet format; and (c) applying a Wi-Fi long range mode to process the symbol part when the symbol part follows the Wi-Fi long range packet format.

In view of above-mentioned embodiments, the Wi-Fi long range packet and Wi-Fi legacy packet can be received and processed by a single communication device, thus the conventional issue can be solved. However, the present invention is not limited to solve such issues.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a schematic diagram illustrating a mixed packet according to one embodiment of the present application.

FIG. 2A is a schematic diagram illustrating a mixed packet according to another embodiment of the present application.

DETAILED DESCRIPTION

Figure 2B:
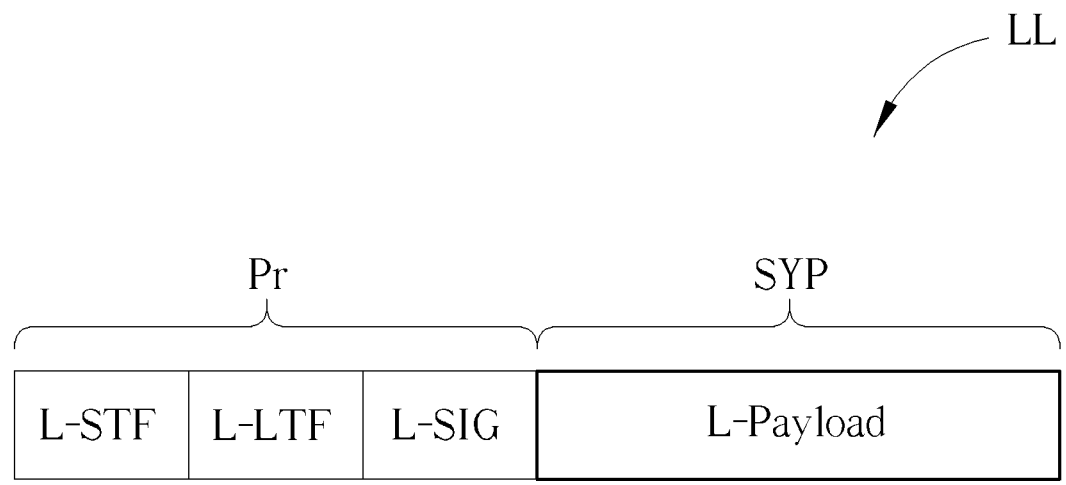
FIG. 2B is a schematic diagram illustrating a conventional Wi-Fi legacy packet format.

In following embodiments, each component can be implemented by hardware (e.g. a circuit or an apparatus) or hardware with software (e.g. a processor installed with at least one program). Further, each component can be separated to more components or be integrated to fewer components. Additionally, the terms "first", "second" in each embodiment are only used to identify different components but do not mean any sequence thereof.

FIG. 1 is a schematic diagram illustrating a mixed packet according to one embodiment of the present application. Please note that some common parts of the packet, such as preamble and data payload, are omitted for simplicity. However, for those skilled in the art may appreciate, other common parts can be added to the packet shown in the embodiment. As illustrated in FIG. 1, the mixed packet PLR comprises a specific format preamble Pr following a first packet format and a symbol part SYP, which contains at least one symbol SY and follows a Wi-Fi long range packet format. In other words, the symbol part SYP in FIG. 1 is a Wi-Fi long range packet.

The specific format preamble Pr can be decoded according to a first communication standard and the symbol part SYP can be processed according to a Wi-Fi long range mode (e.g. the IEEE 802.11ax standard) or a proprietary mode can process a Wi-Fi long range packet. The length (or named data amount) of the symbol part SYP can be determined according to the specific format preamble Pr.

Also, the symbol part SYP can be identified according to identifying information contained in the symbol part SYP. For more detail, the symbol part SYP can be determined if it follows the Wi-Fi long range packet format or follows the first packet format according to the identifying information.

FIG. 2A is a schematic diagram illustrating a mixed packet.

PLR according to another embodiment of the present application. In this embodiment, the specific format preamble Pr is a legacy compatible preamble, which follows a Wi-Fi legacy packet format. However, the specific format preamble Pr can follow any packet format corresponding to different requirements. As illustrated in FIG. 2A, the specific format preamble Pr is a legacy compatible preamble comprising a L-STF (Legacy Short Training Field), a L-LTF (Legacy Long Training Field), and a L-SIG (Legacy Signal Field).

The L-STF can be applied for packet detecting and auto gain control. Also, the L-LTF can be applied for channel estimation. Besides, the L-SIG can be applied for identifying the symbol part SYP. For more detail, as illustrated in FIG. 2A, the L-SIG comprises a rate field, a length field and a tail. As above-mentioned, the length of the symbol part SYP can be determined according to the specific format preamble Pr. In one embodiment, the length of the symbol part SYP can be determined according to the rate field and the length field in L-SIG.

Please refer to FIG. 2A again. As above-mentioned, the symbol part SYP follows a Wi-Fi long range packet format, which comprises a LR-STF (Long Range Short Training Field), a LR-LTF (Long Range Long Training Field), a LR-SIG (Long Range Signal Field) and LR-Payload (Data). The LR-STF, the LR-LTF, the LR-SIG and the LR-payload respectively comprises at least one symbol SY illustrated in FIG. 1.

The LR-STF can be applied for packet detecting and auto gain control. Also, the LR-LTF can be applied for channel estimation. Besides, the LR-SIG can be applied for identifying the symbol part SYP. In one embodiment, the LR-SIG can have a data structure the same as which of the L-SIG. As above-mentioned, the symbol part SYP can be identified according to identifying information contained in the symbol part SYP. In one embodiment, the identifying information is a specific pattern contained in the LR-STF.

In one embodiment, besides the mixed packet PLR illustrated in FIG. 2A, a packet following the Wi-Fi legacy packet format exists in the same communication system. FIG. 2B is a schematic diagram illustrating a conventional Wi-Fi legacy packet format. As illustrated in FIG. 2B, the legacy packet LL comprises a specific format Pr and a symbol part SYP. The same as the mixed packet PLR in FIG. 2A, the specific format Pr also comprises the L-STF, the L-LTF and the L-SIG. However, the symbol part SYP of the legacy packet LL comprises L-Payload (data) rather than the LR-STF, the LR-LTF and the LR-SIG and data of the mixed packet PLR in FIG. 2A. In one embodiment, the symbol part SYP in FIG. 2B does not comprise the above-mentioned specific pattern thus will be determined as data rather than a Wi-Fi long range packet.

Therefore, if a communication device in such communication system receives a packet. The communication device firstly applies the Wi-Fi legacy mode (e.g. IEEE 802.11) to process the specific format preamble Pr to determine the length of the symbol part SYP. After that, the communication device determines which packet format does the symbol part SYP follows according to the identifying information contained in the symbol part SYP. If the packet is the legacy packet LL illustrated in FIG. 2B, the communication device can determine the symbol part SYP follows the Wi-Fi legacy packet format and continuous using the Wi-Fi legacy mode to process the data following the specific format preamble.

On the contrary, if the communication device determines the symbol part SYP follows the Wi-Fi long range packet format, it switches to the Wi-Fi long range mode to process the following symbol part SYP. The "process" here can mean decoding the symbol part SYP following the Wi-Fi long range packet format, or forwarding the packet to another communication device. Related operations will be described later.

Figure 3:
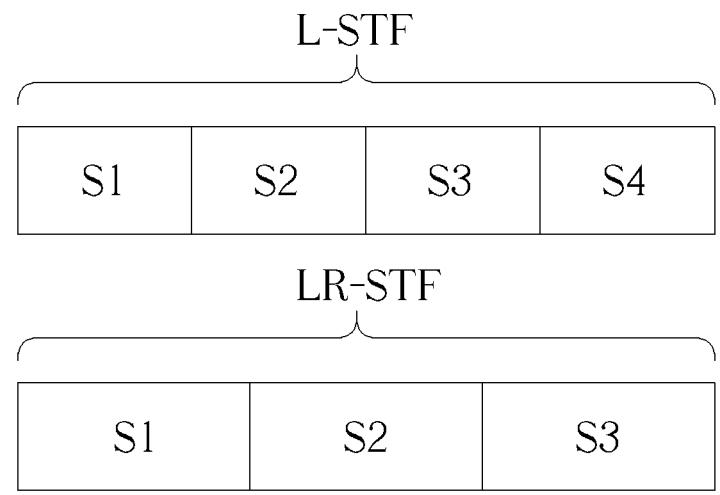
FIG. 3 is a schematic diagram illustrating lengths of basic data units of a L-STF and a LR-STF.

In one embodiment, a length of a basic data unit of a LR-STF of the symbol part SYP is different from which of a basic data unit of a L-STF of the specific format preamble Pr. In other words, the data periods of the L-STF and the LR-STF are different. FIG. 3 is a schematic diagram illustrating lengths of basic data units of a L-STF and a LR-STF. As illustrated in FIG. 3, the L-STF and the LR-STF have the same lengths, but the L-STF are consisted of four basic data units S1-S4, the L-STF are consisted of three basic data units S1-S3. In other words, the data period of the L-STF is ¼ and the data period of the LR-STF is ⅓. By this way, the L-STF and the LR-STF can be distinguished based on lengths of the basic data units.

Figure 4:
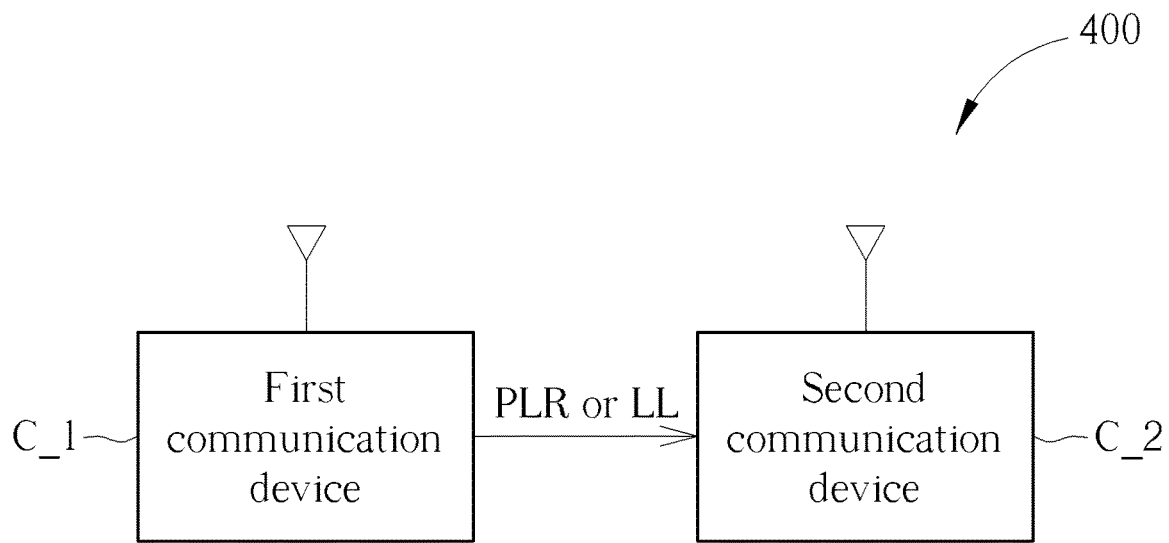
FIG. 4 and FIG. 5 are block diagrams illustrating a communication system comprising a first communication device transmitting a mixed packet and a second communication device receiving the mixed packet, according to different embodiment of the present application.
Figure 5:
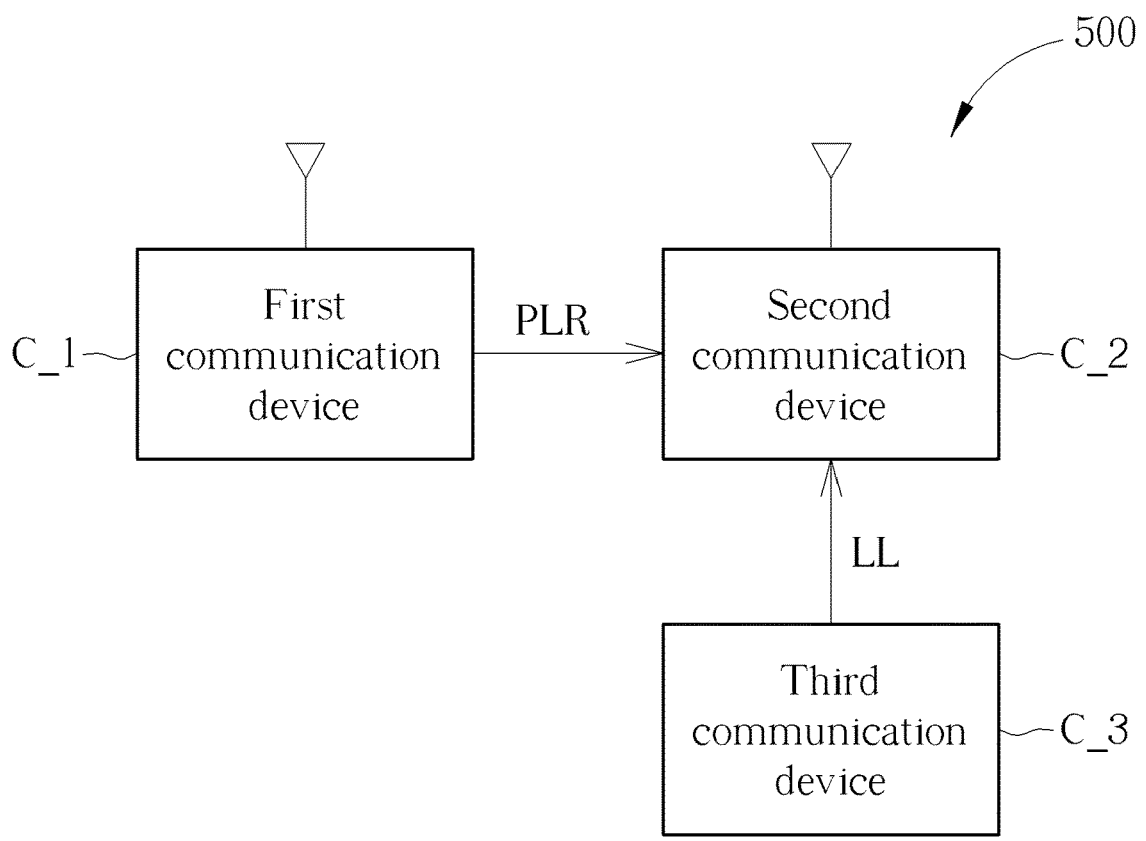

FIG. 4 and FIG. 5 are block diagrams illustrating a communication system comprising a first communication device C_1 transmitting a mixed packet PLR and a second communication device C_2 receiving the mixed packet PLR, according to one embodiment of the present application. As illustrated in FIG. 4, the communication system 400 comprises a first communication device C_1 and a second communication device C_2. The first communication device C_1 transmits a mixed packet PLR to the second communication device C_2. The first communication device C_1 also can transmit a legacy packet LL to the second communication device C_2.

Therefore, after receiving the packet, the second communication device C_2 firstly applies the Wi-Fi legacy mode to process the specific format preamble Pr to determine the length of the symbol part SYP. After that, the communication device C_2 determines which packet format does the symbol part SYP follows according to the identifying information contained in the symbol part SYP. If the packet is the legacy packet LL, the communication device C_2 can determine the symbol part SYP follows the Wi-Fi legacy packet format and continuous using the Wi-Fi legacy mode to decode the data following the specific format preamble.

On the contrary, if the communication device C_2 receives the mixed packet PLR, it switches to the Wi-Fi long range mode to process the following symbol part SYP. As above-mentioned, the "process" here can mean decoding the symbol part SYP based on the Wi-Fi long range mode, or forwarding the symbol part SYP to another communication device. In one embodiment, the communication device C_2 is a legacy communication device. The communication device C_2 receives the mixed packet PLR, and determines the length of the symbol part SYP according to the specific format preamble Pr. After that, the communication device C_2 continuous receiving the symbol part SYP based on the determined length but could not decode the symbol part SYP, since it can only apply the Wi-Fi legacy mode. The symbol part SYP, which is a Wi-Fi long range packet, is forwarded to another communication device while the communication device C_2 receiving the symbol part SYP. In such case, the mixed packet PLR, rather than the symbol part SYP, can be forwarded to another communication device while the communication device C_2 receiving the symbol part SYP.

In such embodiment, the first communication device C_1 can be a communication device can construct the mixed packet PLR or the legacy packet LL, such as a STA (station) can follow the Wi-Fi legacy mode or the Wi-Fi long range mode. Besides, the first communication device C_1 can be a communication device can receive the mixed packet PLR or the legacy packet LL and forwards the mixed packet PLR or the legacy packet LL to the second communication device C_2, such as a master STA can control a Wi-Fi long range STA and a Wi-Fi legacy STA.

As illustrated in FIG. 5, the communication system 500 comprises a first communication device C_1, a second communication device C_2 and a third communication device C_3. The first communication device C_1 transmits a mixed packet PLR to the second communication device C_2. Also, the third communication device C_3 transmits a legacy packet LL to the second communication device C_2.

Therefore, after receiving the packet, the second communication device C_2 firstly applies the Wi-Fi legacy mode to process the specific format preamble Pr to determine the length of the symbol part SYP. After that, the communication device C_2 determines which packet format does the symbol part SYP follows according to the identifying information contained in the symbol part SYP. If the packet is the legacy packet LL, the communication device C_2 can determine the symbol part SYP follows the Wi-Fi legacy packet format and continuous using the Wi-Fi legacy mode to process the data following the specific format preamble Pr.

On the contrary, if the communication device C_2 receives the mixed packet PLR, it switches to the Wi-Fi long range mode to process the following symbol part SYP. As above-mentioned, the "process" here can mean decoding the symbol part SYP based on the Wi-Fi long range mode, or forwarding the symbol part SYP (or the mixed packet PLR) to another communication device. In one embodiment, the communication device C_2 is a legacy communication device. The communication device C_2 receives the mixed packet PLR, and determines the length of the symbol part SYP according to the specific format preamble Pr. After that, the communication device C_2 continuous receiving the symbol part SYP based on the determined length but could not decode the symbol part SYP, since it can only apply the Wi-Fi legacy mode. The symbol part SYP, which is a Wi-Fi long range packet, is forwarded to another communication device while the communication device C_2 receiving the symbol part SYP.

In such embodiment, the first communication device C_1 can be a communication device can construct the mixed packet PLR, such as a STA (station) can apply the Wi-Fi long range mode. Besides, the first communication device C_1 can be a communication device can receive the mixed packet PLR and forwards the mixed packet PLR to the second communication device C_2, such as a master STA can control a Wi-Fi long range STA and a Wi-Fi legacy STA.

Further, in such embodiment, the third communication device C_3 can be a communication device can construct the legacy packet LL, such as a STA can apply the Wi-Fi legacy mode. Besides, the third communication device C_3 can be a communication device can receive the legacy packet LL and forwards the legacy packet LL to the second communication device C_2, such as a master STA can control a Wi-Fi long range STA and a Wi-Fi legacy STA. It will be appreciated that the scope of the present invention is not limited to the communication devices C_1, C_2 illustrated in FIG. 4 and FIG. 5.

Figure 6:
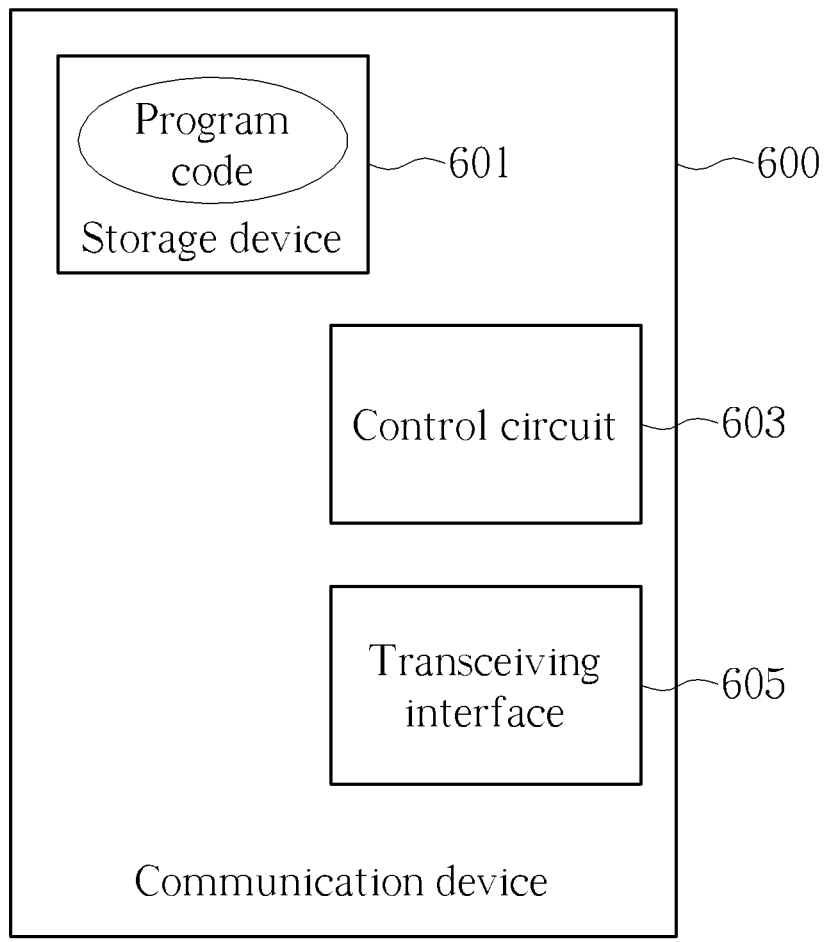
FIG. 6 is a block diagram illustrating an exemplary structure of the communication device illustrated in FIG. 4 and FIG. 5.

FIG. 6 is a block diagram illustrating an exemplary structure of the communication device illustrated in FIG. 4 and FIG. 5. As illustrated in FIG. 6, the communication device 600 comprises a storage device 601, a control circuit 603 and a transceiving interface 605. The storage device 601 stores at least one program code and the control circuit 603 reads the program code to perform above-mentioned embodiments. Also, the transceiving interface 605 is configured to transmit and receive signals. The communication device 600 can be implemented as the first communication device C_1 and the second communication device C_2 illustrated in FIG. 4 and FIG. 5. However, the first communication device C_1 and the second communication device C_2 illustrated in FIG. 4 and FIG. 5 are not limited to the structure depicted in FIG. 6.

In one embodiment, at least part of the mixed packet PLR can be adjusted to provide a better transmitting quality or a better receiving quality. For example, a power level of the specific format preamble Pr can be adjusted by the first communication device C_1 to meet a requirement of a receiver of the second communication device C_2 before transmitting the mixed packet PLR to the second communication device C_2. For example, the power level is adjusted to meet the PAPR (peak to average power ratio) of the receiver. In one embodiment, a length of a length field in the L-SIG can be changed to adjust the power level. In another embodiment, the power level of the symbol part SYP can be adjusted as well.

In another embodiment, time duration (i.e. the length) of the LR-STF and the LR-LTF can be changed to increase a transmitting distance of the mixed packet PLR. For example, if a longer transmitting distance is desired, the time duration of the LR-STF and the LR-LTF can be extended, such that the mixed packet PLR can be easily detected. On the opposite, if only a shorter transmitting distance is needed, the time duration of the LR-STF and the LR-LTF can be shortened. Such operation can be named as Long-short dynamic switch.

In still another embodiment, at least one symbol of the symbol part SYP is frequency duplicated or time duplicated to enhance a transmitting ability of the mixed packet PLR. For example, the LR-STF, the LR-LTF, the LR-SIG, and the LR-Payload can be time duplicated and the LR-SIG, the LR-Payload can be frequency duplicated.

In still another embodiment, a coding rate of at least one symbol of the symbol part SYP to enhance robustness of the symbol part SYP. The coding rate means a ratio of redundant data to real data. The higher the redundant data to real data ratio, the higher the robustness is. On the opposite, the lower the redundant data to real data ratio, the lower the robustness is. Since a format of the mixed packet PLR can ensure the successful transmitting, only a lower coding rate such as BCC 1/4 or LDPC 1/4 is needed.

The following Table 1 depicts an example illustrating the relations between the adjusting steps and the part to which the adjusting steps are performed. The symbol "Y" means the adjusting can be performed to the corresponding part. For example, the power level of the specific format Rr can be adjusted and the LR-STF can be time duplicated. Please note the following table is only an example and does not mean to limit the scope of the present application. For example, the specific type preamble can be time-duplicated if needed.

TABLE 1

|  | Pr | LR-STF | LR-LTF | LR-SIG | LR-Payload |
|---|---|---|---|---|---|
| Power level | Y | Y | Y | Y | Y |
| Coding rate |  |  |  | Y | Y |
| Time duplication |  | Y | Y | Y | Y |
| Frequency duplication |  |  |  | Y | Y |
| Long-short dynamic switch |  | Y | Y |  |  |

The communication system can comprise packets following other packet formats besides the above-mentioned packet formats, such as HT-mixed format or HT-greenfield format. However, the above-mentioned mixed packet PLR can still be identified from the specific format preamble from packets following other packet formats.

Packets are applied as examples for the above-mentioned embodiments, however, other kinds of data units can replace the above-mentioned packets.

In view of above-mentioned embodiments, the Wi-Fi long range packet and Wi-Fi legacy packet can be received and processed by a single communication device, thus the conventional issue can be solved. However, the present invention is not limited to solve such issues.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data unit processing method performed by a first communication device, the method comprising:
configuring a data unit by the first communication device, the data unit comprising:
a specific format preamble following a first packet format and comprising at least a Short Training Field (STF); and
a symbol part, following a Wi-Fi long range packet format, and comprising at least one symbol and at least a Long Range Short Training Field (LR-STF)
wherein the specific format preamble is decoded according to a first communication standard and the symbol part is processed according to a Wi-Fi long range mode;
wherein a length of the symbol part is determined according to the specific format preamble, the determined length of the symbol part is used to identify the LR-STF, and the LR-STF comprises identifying information which indicates the symbol part follows the Wi-Fi long range packet format,
wherein a length of a basic data unit of the STF of the specific format preamble is different from a length of a basic data unit of the LR-STF of the symbol part.

2. The data unit processing method of claim 1, further comprising:
adjusting a power level of the specific format preamble by the first electronic device, to meet a requirement of a receiver of a second communication device before transmitting the data unit to the second communication device.

3. The data unit processing method of claim 2, wherein the first packet format is a Wi-Fi legacy packet format and the first communication standard is a Wi-Fi legacy mode, wherein the data unit processing method further comprises:
adjusting a length of a length field in a legacy short training field (L-SIG) of the specific format preamble by the first communication device, to adjust the power level.

4. The data unit processing method of claim 1, further comprising:
adjusting time duration of a long range short training field (LR-STF) and a long range long training field (LR-LTF) of the symbol part by the first communication device before transmitting the data unit to a second communication device.

5. The data unit processing method of claim 1, further comprising:
frequency duplicating or time duplicating at least one symbol of the symbol part by the first communication device before transmitting the data unit to a second communication device.

6. The data unit processing method of claim 1, further comprising:
adjusting a coding rate of at least one symbol of the symbol part by the first communication device before transmitting the data unit to a second communication device.

7. The data unit processing method of claim 1, wherein the first packet format is a Wi-Fi legacy packet format and the first communication standard is a Wi-Fi legacy mode.

8. The data unit processing method of claim 2, wherein the identifying information is used by the second communication device to determine the symbol part follows the Wi-Fi long range packet format.

9. A data unit processing method performed by a communication device, for processing a data unit comprising, a specific format preamble following a first packet format and comprising at least a Short Training Field (STF), the data unit further comprising a symbol part with at least one symbol following a Wi-Fi long range packet format, and comprising at least a Long Range Short Training Field (LR-STF), wherein a length of a basic data unit of the SIP of the specific format preamble is different from a length of a basic data unit of the LR-STF of the symbol part,
the method comprising:
(a) processing the specific format preamble of the data unit to determine a length of the symbol part, utilizing the determined length of the symbol. part to identify the LR-STF, accessing identifying information contained in the LR-STF, and determining whether the symbol pail follows the first packet format or follows the Wi-Fi long range packet format according to the identifying information;

(b) applying a first communication standard to decode the symbol part responsive to determining that the symbol part follows the first packet format; and (c) applying a Wi-Fi long range mode to process the symbol part responsive to determining that the symbol part follows the Wi-Fi long range packet format.

10. The data unit decoding method of claim 9, wherein the first packet format is a Wi-Fi legacy packet format and the first communication standard is a Wi-Fi legacy mode.

11. The data unit processing method of claim 9, further comprising:

applying a communication device to forward the symbol part to another communication device responsive to determining that the communication device receives the symbol part.

12. A communication device, comprising:

a control circuit configured to execute program codes stored in a storage device to configure a data unit comprising:

a specific format preamble following a first packet format and comprising at least a Short Training Field (STF); and a symbol part, comprising at least one symbol and following a Wi-Fi long range packet format, and comprising at least a Long Range Short Training Field (LR-STF);

wherein the specific format preamble is processed according to a first communication standard and the symbol is processed according to a Wi-Fi long range mode;

wherein a length of the symbol part is determined according to the specific format preamble, the determined length of the symbol part is used to identify the LR-STF, and the LR-STF comprises identifying information which indicates the symbol part follows the Wi-Fi long range packet format, wherein a length of a basic data unit of the STF of the specific format preamble is different from a length of a basic data unit of the LR-STF of the symbol part.

13. The communication device of claim 12, wherein the control circuit is further configured to adjust a power level of the specific format preamble by the first electronic device, to meet a requirement of a receiver of a second communication device before the second communication device receives the data unit.

14. The communication device of claim 13, wherein the first packet format is a Wi-Fi legacy packet format and the first communication standard is a Wi-Fi legacy mode, wherein the control circuit is further configured to adjust a length of a length field in a legacy short training field (L-SIG) of the specific format preamble by the first communication device, to set the power level.

15. The communication device of claim 12, wherein the control circuit is further configured to adjust time duration of a long range short training field (LR-STF) and a long range long training field (LR-LTF) of the symbol part by the first communication device, to increase a transmitting distance of the data unit before the data unit is sent to a second communication device.

16. The communication device of claim 12, wherein the control circuit is further configured to frequency duplicating or time duplicating at least one symbol of the symbol part by the first communication device, to enhance a transmitting ability of the data unit before the data unit is sent to a second communication device.

17. The communication device of claim 12, wherein the control circuit is further configured to adjust a coding rate of at least one symbol of the symbol part by the first communication device, to enhance robustness of the symbol part before the data unit is sent to a second communication device.

18. The communication device of claim 12, wherein the first packet format is a Wi-Fi legacy packet format and the first communication standard is a Wi-Fi legacy mode.

19. A communication device, for processing a data unit comprising a specific format preamble following a first packet format and comprising at least a Short Training Field (STF), the data unit further comprising a symbol part with at least one symbol following a Wi-Fi long range packet format, and comprising at least a Long Range Short Training Field (LR-STFT) wherein a length of a basic data unit of the STF of the specific format preamble is different from a length of a basic data unit of the LR-STF of the symbol part, the communication device comprising:

a control circuit configured to execute program codes stored in a storage device to perform:

(a) processing the specific format preamble of the data unit to determine a length of the symbol part, utilizing the determined length of the symbol part to identify the LR-STF, accessing identifying information contained in the LR-STF, and determining whether the symbol part follows the first packet format or follows the Wi-Fi long range packet format according to the identifying information contained in the symbol part;

(b) applying a first communication standard to decode the symbol part responsive to determining that the symbol part follows the first packet format; and (c) applying a Wi-Fi long range mode to process the symbol part responsive to determining that the symbol part follows the Wi-Fi long range packet format.

20. The communication device of claim 19, wherein the first packet format is a Wi-Fi legacy packet format and the first communication standard is a Wi-Fi legacy mode.

21. The communication device of claim 19, wherein the control circuit is further configured to:

controlling the communication device to forward the symbol part to another communication device responsive to determining that the communication device receives the symbol part.

* * * * *